UNITED STATES PATENT OFFICE.

EMIL FISCHER, OF BERLIN, GERMANY, ASSIGNOR TO FARBENFABRIKEN VORM. FRIEDR. BAYER & CO., OF ELBERFELD, GERMANY, A CORPORATION OF GERMANY.

HIGH-MOLECULAR FATTY ACID CONTAINING ARSENIC.

1,082,509.  Specification of Letters Patent.  Patented Dec. 30, 1913.

No Drawing.   Application filed August 27, 1912.   Serial No. 717,247.

*To all whom it may concern:*

Be it known that I, EMIL FISCHER, doctor of philosophy, professor of chemistry, citizen of the German Empire, residing at Berlin, Germany, have invented new and useful Improvements in High-Molecular Fatty Acid Containing Arsenic, of which the following is a specification.

The acids of the acetylene series possess the property hitherto not yet observed that on being heated with the halogen compounds of arsenic they combine with these products. On using for this reaction high molecular substances, such as stearolic acid ($C_{18}H_{32}O_2$) or behenolic acid ($C_{22}H_{40}O_2$) products similar to fats are obtained which are absorbed in the digestive organs and appear therefore to be valuable for therapeutic purposes. The products thus obtained contain in addition to arsenic, halogen in a quantity approximately equivalent to the amount of arsenic. They are brownish semi-fluid compounds insoluble in water and soluble in alcohol. They are acids and form soluble alkali salts and insoluble calcium and strontium salts.

In order to illustrate the new process more fully the following examples are given, the parts being by weight:—

Example 1: 2 parts of stearolic acid and 3 parts of arsenic trichlorid ($AsCl_3$) are heated in a closed vessel for 6 hours to 140° C. The product of the reaction is a brown oily substance from which unchanged $AsCl_3$ can be removed by distillation *in vacuo* or more conveniently in the following ways: The product of the reaction is dissolved in ether and shaken repeatedly with water which treatment results in the separation of arsenic trioxid. The ethereal solution is carefully concentrated and poured into a normal potash solution cooled by ice that a clear solution results. After a few minutes the resulting solution is acidulated with dilute hydrochloric acid, the precipitated fatty substance is extracted with ether and the ether is dried with calcium chlorid. After evaporation of the ether a dark colored thick oil remains. It is dissolved in warm petrol ether and the resulting solution is evaporated *in vacuo* and by being left for some time *in vacuo*, the petrol ether can be entirely removed from it. A semi-fluid brownish product results containing about 10 to 11 per cent. arsenic and 6 to 7 per cent. chlorin. It is insoluble in water and soluble in the usual organic liquids *e. g.* alcohol and ether.

In order to prepare the strontium salt the product is dissolved in alcohol and poured into a well cooled solution containing an excess of strontium chlorid in methyl alcohol, through which ammonia gas is being passed. A heavy amorphous precipitate of a slightly brownish color separates, which is collected on a filter and carefully washed with alcohol. After drying the salt forms a flesh colored tasteless powder insoluble in water and containing essentially about 12 per cent. of arsenic. The calcium salt has essentially the same properties.

Example 2: 10 parts of behenolic acid and 15 parts of arsenic trichlorid are heated for 6 hours to 140° C. The resulting product is less colored than the corresponding stearolic acid compound and is isolated in the same way as the latter product. It is finally obtained as a light brown thick oil containing about 15 to 15.5 per cent. of arsenic and 5–6 per cent. of chlorin. On allowing the oil to stand for some time unchanged behenolic acid separates in crystals. The oil after being separated from it contains a higher percentage of arsenic. This separation can also be effected by solution in a small quantity of alcohol and strong cooling of this solution.

The strontium salt is prepared as described in Example 1, and forms an almost colorless, tasteless powder containing about 12 to 14 per cent. of arsenic.

Example 3: 2 parts of behenolic acid and 5 parts of $AsBr_3$ are heated for 14 hours to 120–140° C. The product of the reaction is a dark colored thick oil. It is worked up as described in Example 1. The resulting product is a semi-solid brown substance containing bromin and a few per cent. of arsenic.

I claim:—

1. The herein described new high-molecular fatty acid compounds containing arsenic and halogen, which in the acid form are semi-fluid brownish compounds practically insoluble in water and soluble in alcohol, forming salts with metals which retain the valuable therapeutic properties exhibited by the acids, substantially as described.

2. The herein described new high-molecular fatty acid compounds containing arsenic and chlorin, which in the acid form are semi-fluid brownish compounds practically insoluble in water and soluble in alcohol, forming salts with metals which retain the valuable therapeutic properties exhibited by the acids, substantially as described.

3. The herein described new product being a stearolic acid compound containing arsenic and halogen, which is in the acid form a semi-fluid brownish compound insoluble in water and soluble in alcohol and ether, forming metal salts which retain the valuable therapeutic properties exhibited by the acid, substantially as described.

4. The herein described new product being a stearolic acid compound containing arsenic and chlorin, which is in the acid form a semi-fluid brownish compound insoluble in water and soluble in alcohol and ether, forming metal salts which retain the valuable therapeutic properties exhibited by the acid, substantially as described.

In testimony whereof I have hereunto set my hand in the presence of two subscribing witnesses.

EMIL FISCHER.

Witnesses:
 HENRY HASPER,
 ARTHUR SCHROEDER.